UNITED STATES PATENT OFFICE.

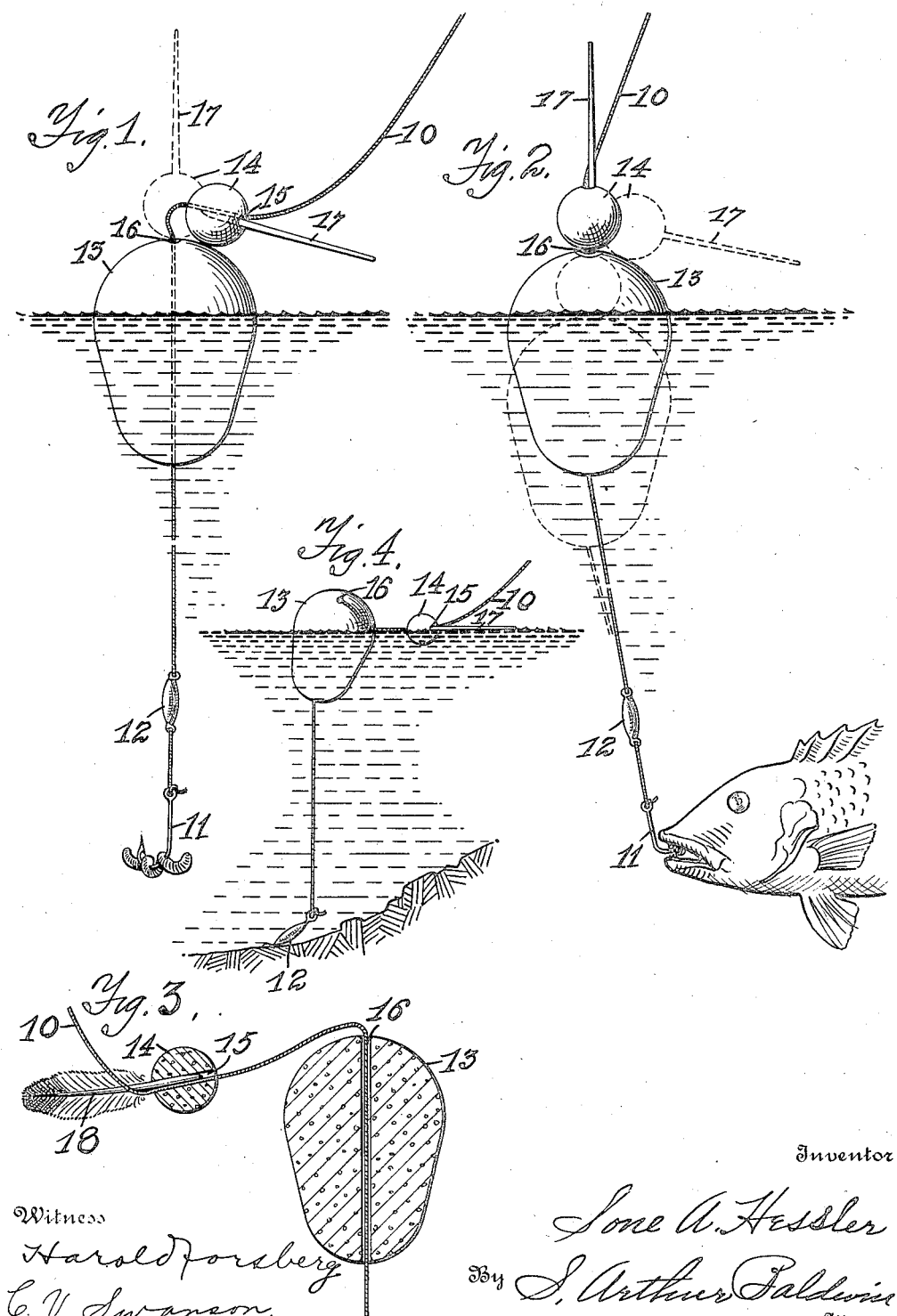

SONE A. HESSLER, OF JAMESTOWN, NEW YORK.

DUPLEX FLOAT FOR FISHING-LINES.

1,317,496.　　　　Specification of Letters Patent.　　Patented Sept. 30, 1919.

Application filed June 21, 1919. Serial No. 305,862.

*To all whom it may concern:*

Be it known that I, SONE A. HESSLER, a citizen of the United States, residing at the city of Jamestown, in the county of Chautauqua and State of New York, have invented certain new and useful Improvements in Duplex Floats for Fishing-Lines, of which the following, taken in connection with the accompanying drawings, is a specification.

The invention relates to floats for fishing lines; and the object of the improvement is to provide a duplex float, the lower part of which is freely movable upon the line and the upper part is movably attachable by means of a quill or staff which acts as a flag or signal whenever there is a bite and pull on the line, the adjacent parts of the float being oppositely curved so as to roll one upon the other as they are drawn into contact by the draw of the line from said bite, thereby rendering the action of the flag or signal very sensitive so that the difference between a nibble and a bite is obvious and the user knows just when to strike in order to hook the fish, yet permits the return of the hook and line to the fishing position without splashing and frightening the fish should a strike fail; and the invention consists in the novel features and combinations hereinafter set forth and claimed.

In the drawings, Figure 1 is an elevation of the duplex float in the normal fishing position waiting for a bite, showing the same on the surface of the water with the hook and bait in position below and the upper ball shaped portion of the float resting on the lower portion of the float, the action of the flag or signal being shown in dotted outline when there is a bite; and Fig. 2 is a similar view in the water with a fish on the line and the signal in the upright position, the action of the duplex float from the bite being shown in dotted outline. Fig. 3 is a vertical sectional view of the two parts of the float showing the manner of adjustably fastening the upper portion of the float on the line, and showing a feather as a signal or flag. Fig. 4 is an elevation of the duplex float as used to measure the depth of the water, the sinker resting on the bottom and the float riding on the surface of the water.

Like characters of reference refer to corresponding parts in the several views.

The numeral 10 designates the fishing line which has the hook 11 and sinker 12 thereon, the sinker 12 being preferably movably attached upon the line.

The numeral 13 designates the lower portion of the duplex float and the numeral 14 the upper portion. The parts 13 and 14 have the openings 15 and 16 therethrough to slidably receive the line 10 so as to quickly and easily adjust the line within said portions 13 and 14 as desired. A visible flag or signal is provided which preferably consists of a short staff or pin 17 which is inserted in the hole 15 of the upper portion 14 of the float to thereby hold the line 10 firmly in position and may be colored to insure sight in rough water. A more clearly discernible feather 18 may be used instead of the signal 17 as shown in Fig. 3 without departing from the invention, the quill of the feather serving as an attaching pin for the line 10 within the opening 15 in the part 14, and the feather part forms a light and easily discernible flag.

The line 10 preferably slides freely through the lower portion 13 of the float thereby making it possible to quickly and easily measure the depth of the water by dropping the sinker 12 until it rests upon the bottom. In order to do this the upper portion 14 is moved sufficiently along the line to permit the line 10 to pass freely through said lower portion 13 until said sinker 12 rests on the bottom 19 at which point the float 13 will ride on the surface and measure the depth. Should the water be so deep that the sinker 12 cannot reach the bottom, the signal 17 will show in the upright position as shown in Fig. 2 and the float 14 must be moved farther up the line. As soon as the depth of the water is obtained, the line and hook may be quickly and easily adjusted so as to place the hook at the proper position above the bottom 19 for fishing.

The upper and lower portions 13 and 14 of the duplex float are oppositely curved in their relation to one another so that when a bite is given, the draw of the line 10 will automatically cause the upper portion 14 to roll up on the oppositely curved surface of the part 13 and whirl into position as shown in Fig. 2, instantly being relieved and returning to the inclined position as soon as the draw of the line is slackened, vibrating back and forth when a fish is on the line, the rounding surfaces between the two parts 13 and 14 giving added sensitiveness thereto and ease of action.

When a fish is hooked and a strike is made, the float 13 is not drawn from the water, thereby splashing and scaring the fish, but freely draws through the opening 16 leaving the larger portion 13 of the float in position upon the water so that if the fish is not hooked in the first attempt, the line runs back and the baited hook takes about the same position as before so that an added impetus is given to the desire of the fish in its endeavor to catch the bait, thereby rendering it much more certain to catch the fish.

The parts 13 and 14 are preferably made of wood, cork or other light material, the sinker being the only heavy portion of the fishing tackle. This light weight construction with the flag or signal 17 or 18 makes an ideal fishing tackle for fishing in rough water, the sinker making it possible to throw the line with accuracy and the flag signaling the bite.

I claim as new:

1. A float for fishing lines comprising two oppositely curved float parts which roll upon one another when drawn together, the fishing line freely slidable through the lower float part, the upper float part adjustably attachable on said fishing lines, and a visible signal on the attaching means for said upper float part which is drawn to an upright position on said lower float part by the downward draw of the line therethrough from a fish bite and falls when released.

2. A fishing float comprising two parts curved oppositely to one another on their adjacent sides to roll upon one another when moving the upper float part to or from an upright position on the lower float part, said parts each having a hole therethrough to slidably receive the fishing line and a visible staff-like element receivable in said hole alongside said fish line in the upper float part to adjustably attach the same to the fishing line and to act as a discernible signal when drawn to said upright position by a fish bite.

3. A fishing float comprising upper and lower float parts slidably mounted on the fishing line, said upper float part ball shaped, said lower float part larger than said upper float part and having a rounding upper end to roll said upper ball shaped float part to and from an upright position on said rounding upper end by the draw or release of the fish line through said lower part when said upper part is attached to said fish line, and means on said upper part to act as a visible signal or flag when drawn into said upright position.

In testimony whereof I have affixed my signature in the presence of two witnesses.

SONE A. HESSLER.

Witnesses:
C. V. SWANSON,
H. P. ANDERSON.